United States Patent
Oura

(10) Patent No.: US 11,411,243 B2
(45) Date of Patent: Aug. 9, 2022

(54) ALL-SOLID BATTERY

(71) Applicant: TOYOTA JIDOSHA KABUSHIKI KAISHA, Toyota (JP)

(72) Inventor: Kei Oura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 25 days.

(21) Appl. No.: 16/411,759

(22) Filed: May 14, 2019

(65) Prior Publication Data

US 2019/0372157 A1 Dec. 5, 2019

(30) Foreign Application Priority Data

May 30, 2018 (JP) .............................. JP2018-103958

(51) Int. Cl.
*H01M 10/0562* (2010.01)
*H01M 50/183* (2021.01)
*H01M 4/134* (2010.01)
*H01M 10/0525* (2010.01)
*H01M 4/62* (2006.01)
*H01M 10/058* (2010.01)
*H01M 4/36* (2006.01)

(52) U.S. Cl.
CPC ....... *H01M 10/0562* (2013.01); *H01M 4/134* (2013.01); *H01M 4/364* (2013.01); *H01M 4/621* (2013.01); *H01M 10/058* (2013.01); *H01M 10/0525* (2013.01); *H01M 50/183* (2021.01)

(58) Field of Classification Search
CPC ............. H01M 10/0562; H01M 4/621; H01M 50/183; H01M 50/19; H01M 50/193
See application file for complete search history.

(56) References Cited

U.S. PATENT DOCUMENTS

2002/0127467 A1* 9/2002 Watanabe ......... H01M 10/0525
429/90
2004/0253512 A1 12/2004 Watanabe et al.
(Continued)

FOREIGN PATENT DOCUMENTS

JP 2005-005163 A 1/2005
JP 2016033880 A * 3/2016
(Continued)

OTHER PUBLICATIONS

Matsuyama et al. JP 2017-073374. Apr. 13, 2017. English machine translation. (Year: 2017).*

(Continued)

*Primary Examiner* — James Lee
(74) *Attorney, Agent, or Firm* — Sughrue Mion, PLLC

(57) ABSTRACT

One aspect of the present invention provides an all-solid battery including a laminated electrode body having a structure portion in which an electrode mixture material layer and a solid electrolyte layer are laminated, and a sealing part for covering a lamination end face of the laminated electrode body. The electrode mixture material layer includes an active material and a binder resin. The sealing part includes a sealing resin and an insulation particle. The absolute value of the difference between the solubility parameter of the binder resin included in the electrode mixture material layer and the solubility parameter of the sealing resin included in the sealing part is 1.9 $(cal/cm^3)^{0.5}$ or less.

19 Claims, 2 Drawing Sheets

(56) References Cited

U.S. PATENT DOCUMENTS

| | | |
|---|---|---|
| 2009/0233164 A1 | 9/2009 | Shimamura et al. |
| 2015/0147660 A1* | 5/2015 | Fujiki .................. H01M 4/622 |
| | | 429/306 |
| 2016/0099441 A1* | 4/2016 | Harayama ............ H01M 50/116 |
| | | 429/158 |
| 2017/0373300 A1 | 12/2017 | Maeda et al. |
| 2018/0102514 A1* | 4/2018 | Dai ........................ H01G 11/80 |

FOREIGN PATENT DOCUMENTS

| | | | |
|---|---|---|---|
| JP | 2017073374 A | * | 4/2017 |
| WO | 2006/062204 A1 | | 6/2006 |

OTHER PUBLICATIONS

Yoshida et al. JP 2016-033880. Mar. 10, 2016. English machine translation. (Year: 2016).*

Chang, "Xianjiao Changyong Shuju Sucha Shouce", Concise handbook of common data for rubber, 2012, pp. 116-123 (19 pages total).

Lei et al., "Material physics experiment course", 2018 (12 pages total).

\* cited by examiner

ALL-SOLID BATTERY

CROSS REFERENCE TO RELATED APPLICATION

This application claims the benefit of priority to Japanese Patent Application No. 2018-103958 filed on May 30, 2018. The entire contents of this application are hereby incorporated herein by reference.

BACKGROUND OF THE DISCLOSURE

1. Field

The present invention relates to an all-solid battery.

2. Background

Conventionally, a technology of enhancing the waterproof property and the durability of a lithium battery has been known. For example, Japanese Patent Application Publication No. 2005-5163 discloses a battery including a bipolar electrode in which a positive electrode active material layer is formed on one surface of a collector, and a negative electrode active material layer is formed on the other surface thereof. In the battery, the entire circumference of an electrode body including a plurality of bipolar electrodes and electrolyte layers laminated one on another is covered with a resin, and a sealing part is provided around the electrode body.

SUMMARY

However, a study by the present inventors has indicated that there is still room for improvement of the technology in view of, for example, the long-term durability. As one example, a battery mounted on a vehicle is intermittently and repeatedly applied with random and low-frequency vibrations by, for example, vibrations of running and driving systems. Further, in association with rapid charging and discharging of a battery, an electrode body may be expanded or shrunk largely instantly. As a result, a sealing part is peeled from the electrode body, so that the effects of the technology undesirably have not lasted.

The present invention was completed in view of such points. It is an object thereof to provide an all-solid battery improved in adhesion between an electrode body and the sealing part.

One aspect of the present invention provides an all-solid battery including a laminated electrode body having a structure portion in which an electrode mixture material layer and a solid electrolyte layer are laminated, and a sealing part for covering at least a lamination end face of the laminated electrode body. The electrode mixture material layer includes an active material and a binder resin. The sealing part includes a sealing resin and an insulation particle. The absolute value of the difference between the solubility parameter of the binder resin included in the electrode mixture material layer and the solubility parameter of the sealing resin included in the sealing part is 1.9 $(cal/cm^3)^{0.5}$ or less.

For the all-solid battery, the difference in solubility parameter between the binder resin and the sealing resin is suppressed to a prescribed value or less, so that the compatibility between the binder resin and the sealing resin is improved. This has enhanced the adhesion and the integrity between the laminated electrode body and the sealing part in the all-solid battery. Further, for the all-solid battery, the sealing part includes insulation particles, resulting in an improvement of the mechanical strength of the sealing part. By the action described up to this point, for the all-solid battery, for example, also when an external force such as vibration is repeatedly applied, peeling of the sealing part from the laminated electrode body is less likely to be caused, so that the effects of the technology herein disclosed can be kept for a long term.

In the present specification, "Solubility Parameter: SP value" represents the solubility parameter calculated by the Fedors method. Incidentally, in the following description, the solubility parameter may be referred to simply as "SP value". The SP value is a value inherent in each substance. Further, the SI unit of the SP value is $(J/cm^3)^{0.5}$ or $(MPa)^{0.5}$, and in the present specification, conventionally and commonly used $(cal/cm^3)^{0.5}$ is used. The unit of the SP value can be converted by the following expression: 1 $(cal/cm^3)^{0.5} \approx$ 2.05 $(J/cm^3)^{0.5} \approx$ 2.05 $(MPa)^{0.5}$. Incidentally, in the following description, the unit of the SP value may be omitted.

In another aspect of the present invention, the binder resin and the sealing resin include the same kind of resin. This can better enhance the adhesion and the integrity between the laminated electrode body and the sealing part, so that the effects of the technology herein disclosed can be exerted at a higher level.

In a still other aspect of the present invention, the binder resin and the sealing resin include rubbers, respectively. Generally, rubbers undergo a very small change in volume in deformation. For this reason, inclusion of rubbers can better improve the adhesion and the integrity between the laminated electrode body and the sealing part.

In a still other aspect of the present invention, the electrode mixture material layer includes a Si type material as the active material. Generally, a Si type material undergoes a relatively larger change in volume in charging and discharging as compared with, for example, a carbon material. For this reason, when the electrode mixture material layer includes a Si type material, peeling of the sealing part tends to be caused. Therefore, application of the technology herein disclosed produces higher effects.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
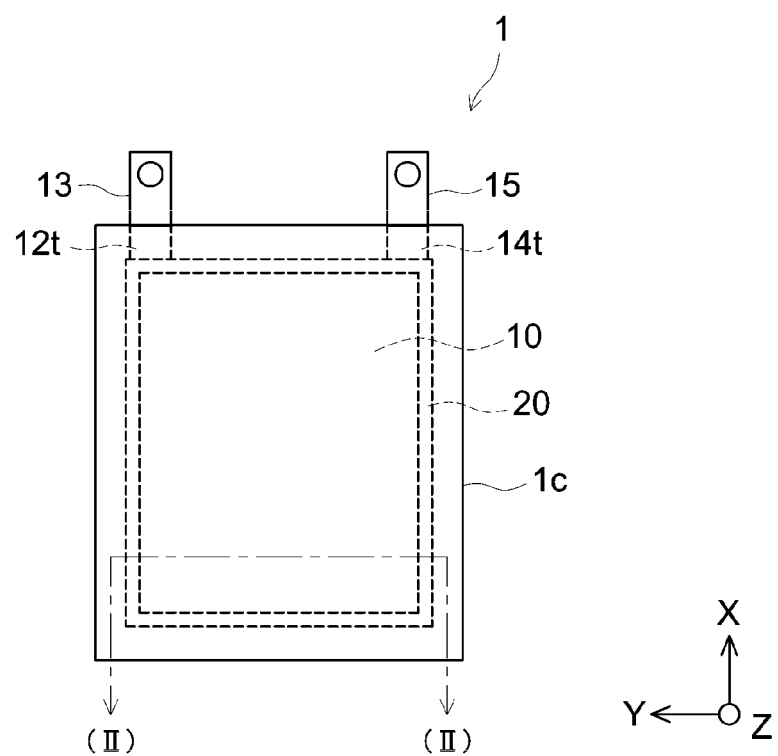
FIG. 1 is a plan view schematically showing an all-solid battery in accordance with one embodiment of the present invention.

Below, appropriately by reference to the accompanying drawings, embodiments of an all-solid battery herein disclosed will be described. Incidentally, it is naturally understood that the embodiments herein described are not intended to particularly restrict the technology herein disclosed. Matters necessary for carrying out the technology herein disclosed, except matters specifically referred to in the present specification, can be grasped as design matters of those skilled in the art based on the related art in the present field. The all-solid battery herein disclosed can be executed based on the contents disclosed in the present specification, and the technical common sense in the present field. Further, it is assumed that, when the numerical value range is described as A to B (herein, A and B are each a given numerical value) in the present specification, the numerical value means A or more and B or less.

Incidentally, in the following drawings, the members/portions producing the same action are given the same reference numeral and sign, and a repeated description thereon may be omitted or simplified. Further, it is assumed that a reference sign Z in each drawing means the direction of lamination of a laminated electrode body. It is assumed that a reference sign X in each drawing means the direction orthogonal to the lamination direction Z, and the direction of long sides of the laminated electrode body. It is assumed that a reference sign Y in each drawing means a direction orthogonal to the lamination direction Z, and the direction of short sides of the laminated electrode body. It is assumed that reference signs L and R in each drawing mean the left and the right of the short side direction, respectively. However, these are the directions for convenience of description, and do not restrict the setting mode of the all-solid battery at all.

Figure 2:
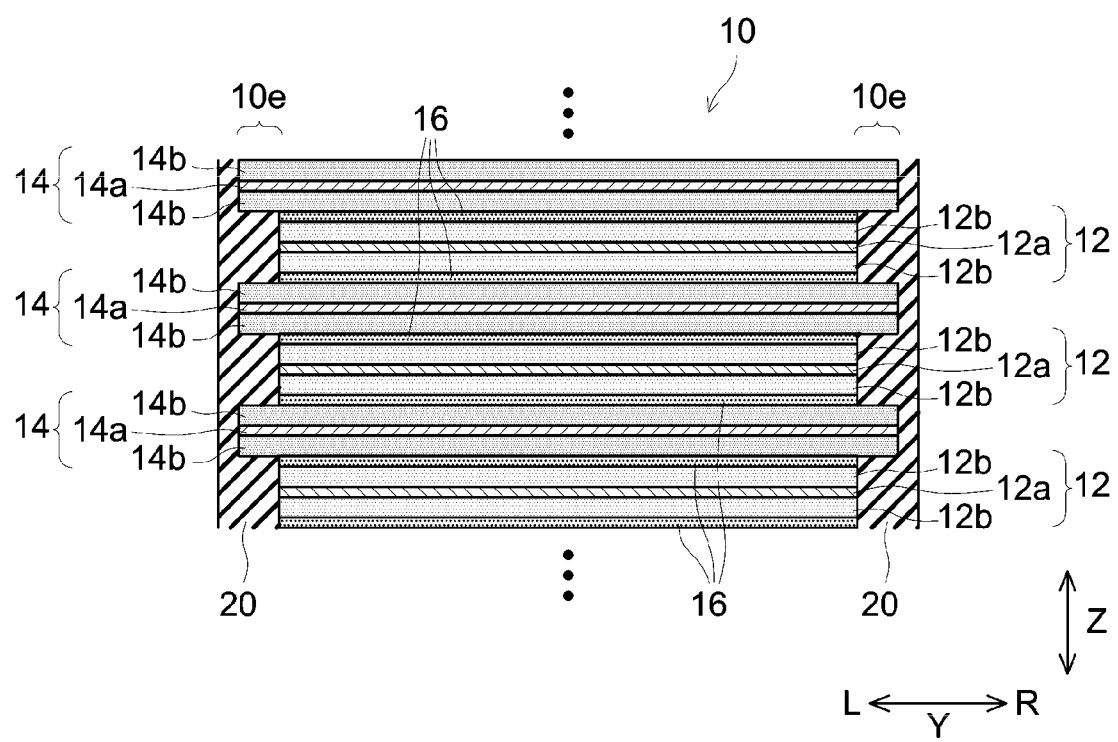
FIG. 2 is a cross sectional view along line II-II of FIG. 1.

FIG. 1 is a plan view schematically showing an all-solid battery 1. FIG. 2 is a cross sectional view along line II-II of the all-solid battery 1. The all-solid battery 1 is a power storage device capable of accumulating electric power. The all-solid battery 1 is typically a secondary battery capable of charging and discharging. Examples of the secondary battery may include lithium ion secondary battery, nickel hydrogen battery, lithium ion capacitor, and electrical double layer capacitor. The all-solid battery 1 may be a sulfide solid battery, an oxide solid battery, or the like. As shown in FIG. 1, the all-solid battery 1 of the present embodiment includes a laminated electrode body 10, and a sealing part 20 covering at least a lamination end face (edge surface) 10e of the laminated electrode body 10. The all-solid battery 1 is herein a laminate type battery using a laminate film as an exterior body. The all-solid battery 1 includes the laminated electrode body 10 and the sealing part 20 accommodated and sealed in a rectangular battery case 1c made of a laminate. Below, respective constituent elements will be successively described.

As shown in FIG. 2, the laminated electrode body 10 has positive electrodes 12, negative electrodes 14, and solid electrolyte layers 16. The laminated electrode body 10 includes a structure portion in which the positive electrodes 12 and the negative electrodes 14 are laminated via the solid electrolyte layers 16 the lamination direction Z, and are physically integrated. Each positive electrode 12 includes a positive electrode collector 12a, and positive electrode mixture material layers 12b respectively fixed to both surfaces of the positive electrode collector 12a. Each negative electrode 14 includes a negative electrode collector 14a, and negative electrode mixture material layers 14b respectively fixed to both surfaces of the negative electrode collector 14a. In the lamination direction Z, the solid electrolyte layer 16 is arranged between the positive electrode mixture material layer 12b and the negative electrode mixture material layer 14b, and insulates the positive electrode 12 and the negative electrode 14. The positive electrode mixture material layers 12b and the negative electrode mixture material layers 14b are laminated via the solid electrolyte layers 16 in the lamination direction Z. The positive electrode mixture material layer 12b and the solid electrolyte layer 16 are interface bonded to each other. The negative electrode mixture material layer 14b and the solid electrolyte layer 16 are interface bonded to each other.

The positive electrode 12 is in a sheet-like shape. As shown in FIG. 1, the positive electrode 12 is in a rectangular shape in a plan view. At one end in a long side direction X of the positive electrode 12, a tab part 12t of the exposed portion of the positive electrode collector 12a is provided. The positive electrode 12 is electrically connected with a positive electrode terminal 13 via the tab part 12t. A positive electrode terminal 13 is a connection terminal led out from the inside to the outside of the battery case 1c. Incidentally, in the present embodiment, the positive electrode 12 includes the positive electrode collector 12a, and the positive electrode mixture material layers 12b respectively fixed to both surface of the positive electrode collector 12a. However, the positive electrode 12 is not required to have the positive electrode collector 12a. Further, the positive electrode mixture material layer 12b may be fixed to only one surface of the positive electrode collector 12a. The positive electrode collector 12a is a conductive member. Although not particularly restricted, the positive electrode collector 12a is made of a metal with good conductivity such as Al, Ti, or Ni.

The positive electrode mixture material layer 12b typically includes a positive electrode active material and a binder resin. The positive electrode active material is a material capable of reversibly occluding and releasing a charge carrier (e.g., lithium ion). Although not particularly restricted, examples of the positive electrode active material may include metal oxides containing one or two or more metal elements, and an oxygen element. The metal oxide may be a compound containing a lithium element, one or two or more transition metal elements, and an oxygen element. Preferable examples of the metal oxide may include lithium transition metal composite oxides such as lithium nickel-containing composite oxide, lithium cobalt-containing composite oxide, lithium nickel cobalt-containing composite oxide, lithium manganese-containing composite oxide, lithium nickel cobalt manganese-containing composite oxide. The positive electrode active material may have a nanometer-thick coat layer including an oxide such as $LiNbO_3$ on the surface thereof for the purpose of, for example, reducing the interface resistance with the solid electrolyte layer 16.

Examples of the binder resin may include vinyl halide resins such as polyvinylidene fluoride (PVdF) and copolymer of polyvinylidene fluoride and hexafluoropropylene (PVdF-HFP); rubbers such as butadiene rubber (BR), acrylate butadiene rubber (ABR), styrene-butadiene rubber (SBR), acrylonitrile-butadiene rubber (NBR), butyl rubber (isobutylene-isoprene rubber), ethylene-propylene rubber, ethylene-propylene-diene rubber, urethane rubber, silicone rubber, fluoro rubber, and natural rubber; polyolefin resins such as polyethylene and polypropylene; and polyimide resins such as polyimide, polyamideimide, and polyether imide. The binder resin may be a diene type rubber containing a double bond at the main chain, such as a butadiene type rubber having a butadiene content of 30 mol % or more based on the total amount. The SP value (SPp) of the binder resin included in the positive electrode mixture material layer 12b may be, for example, 15 or less, 10 or less, or 9 or less, and may be 5 or more, 7 or more, or 8 or more. Incidentally, when the positive electrode mixture material layer 12b includes a plurality of kinds of resin materials, the mass weighted mean value of the SP values of respective resin materials can be referred to as SPp.

Although not particularly restricted, the mixing ratio of the binder resin in the positive electrode mixture material layer 12b may be, for example, 0.1 to 20 parts by mass, 1 to 10 parts by mass, or 3 to 7 parts by mass for every 100 parts by mass of the positive electrode active material.

The positive electrode mixture material layer 12b may include, in addition to the positive electrode active material and the binder resin, other components such as a solid electrolyte material, a conductive material, and various additives, if required. Examples of the solid electrolyte material may include inorganic solid electrolyte materials such as sulfide solid electrolyte material, oxide solid electrolyte material, nitride solid electrolyte material, and halide solid electrolyte material. More specifically, as the materials forming the solid electrolyte layer 16, mention may be made of sulfide solid electrolyte materials as described later. Examples of the conductive material may include carbon materials such as acetylene black, carbon black, graphite, carbon fiber, and carbon nanotube.

The negative electrode 14 is in a sheet-like shape. As shown in FIG. 1, the negative electrode 14 is in a rectangular shape in a plan view. At one end in a long side direction X of the negative electrode 14, a tab part 14t of the exposed portion of the negative electrode collector 14a is provided. The tab part 14t is provided on the same side as that of the tab part 12t on the positive electrode side. The negative electrode 14 is electrically connected with a negative electrode terminal 15 via the tab part 14t. The negative electrode terminal 15 is a connection terminal led out from the inside to the outside of the battery case 1c. The negative electrode terminal 15 is led from the same side as that of the positive electrode terminal 13. Incidentally, in the present embodiment, the negative electrode 14 includes the negative electrode collector 14a, and the negative electrode mixture material layers 14b respectively fixed to both surface of the negative electrode collector 14a. However, the negative electrode 14 is not required to have the negative electrode collector 14a. Further, the negative electrode mixture material layer 14b may be fixed to only one surface of the negative electrode collector 14a. The negative electrode collector 14a is a conductive member. Although not particularly restricted, the negative electrode collector 14a is made of a metal with good conductivity such as Cu, Ti, or Ni.

The negative electrode mixture material layer 14b typically includes the negative electrode active material and the binder resin. The negative electrode active material is a material capable of reversibly occluding and releasing a charge carrier (e.g., lithium ion). Although not particularly restricted, examples of the negative electrode active material may include carbon materials such as hard carbon, graphite, and boron-added carbon, metal materials such as Al, Si, Ti, In, and Sn, metal compounds including metal elements, metal oxides, Li metal compounds, and Li metal oxides. Examples of Li metal oxide may include lithium transition metal composite oxides such as lithium titanate. The negative electrode active material may be, for example, a Si type material having a content of silicon (Si) of about 50 mass % or more. The proportion of Si in the negative electrode active material may be, for example, 80 mass % or more. The Si type material may be at least one of Si, Si alloy, Si compound, and Si mixture. The Si type material undergoes a large change in volume in charging and discharging (particularly, in rapid charging and discharging). For this reason, when the negative electrode mixture material layer 14b includes a Si type material, peeling of the sealing part 20 tends to be caused. Therefore, application of the technology herein disclosed is preferable.

As the binder resins, for example, those exemplified as the materials usable for the positive electrode mixture material layer 12b may be appropriately used. In one embodiment, the negative electrode mixture material layer 14b may include the same kind of binder resin as that of the positive electrode mixture material layer 12b. The same kind of binder resin desirably accounts for 50 mass % or more of the total amount of the binder resins included in the negative electrode mixture material layer 14b. For example, the positive electrode mixture material layer 12b and the negative electrode mixture material layer 14b may include rubbers (e.g., butadiene type rubbers) as the binder resins, respectively. For example, the positive electrode mixture material layer 12b and the negative electrode mixture material layer 14b may include vinyl halide resins as the binder resins, respectively. The SP value (SPn) of the binder resin included in the negative electrode mixture material layer 14b may be, for example, 15 or less, 10 or less, or 9 or less, and may be 5 or more, 7 or more, or 8 or more. Incidentally, when the negative electrode mixture material layer 14b includes a plurality of kinds of resin materials, the mass weighted mean value of SP values of respective resin materials can be referred to as SPn. In one embodiment, the absolute value of the difference between the SP value of the binder resin of the negative electrode mixture material layer 14b and the SP value of the binder resin of the positive electrode mixture material layer 12b is desirably 3 or less, 2 or less, 1 or less, or 0.5 or less. For example, the SP value of the binder resin of the negative electrode mixture material layer 14b and the SP value of the binder resin of the positive electrode mixture material layer 12b may be the same.

Although not particularly restricted, the mixing ratio of the binder resin in the negative electrode mixture material layer 14b may be, for example, 0.1 to 20 parts by mass, 1 to 10 parts by mass, or 3 to 7 parts by mass for every 100 parts by mass of the negative electrode active material.

The negative electrode mixture material layer 14b may include, in addition to the negative electrode active material and the binder resin, other components such as a solid electrolyte material, a conductive material, and various additives, if required. As the solid electrolyte material and the conductive material, for example, those exemplified as the materials capable of forming the positive electrode mixture material layer 12b may be appropriately used.

The solid electrolyte layer 16 has an ion conductivity. For example, a lithium ion secondary battery has a Li ion conductivity. The solid electrolyte layer 16 is insulating. The solid electrolyte layer 16 is typically smaller in thickness in the lamination direction Z than the positive electrode mixture material layer 12b and the negative electrode mixture material layer 14b. In the present embodiment, the solid electrolyte layer 16 is in a solid state at room temperature (25° C.). The solid electrolyte layer 16 includes at least a solid electrolyte material. The ion conductivity (e.g., Li ion conductivity) of the solid electrolyte material may be, for example, $1 \times 10^{-5}$ S/cm or more, and further $1 \times 10^{-4}$ S/cm or more at room temperature (25° C.). The solid electrolyte material may be vitreous (amorphous), may be crystallized vitreous, or may be crystalline. The solid electrolyte material may be one or two or more of, for example, sulfide solid electrolyte material, oxide solid electrolyte material, nitride solid electrolyte material, and halide solid electrolyte material.

Although not particularly restricted, examples of the sulfide solid electrolyte material may include sulfide materials of $Li_2S$—$P_2S_5$ type materials such as $Li_2S$—$P_2S_5$, $Li_2S$—$P_2S_5$—$LiI$, $Li_2S$—$P_2S_5$—$Li_2O$, and $LiI$—$Li_2O$—

Li$_2$S—P$_2$S$_5$; Li$_2$S—SiS$_2$ type materials; Li$_2$S—P$_2$S$_3$ type materials; Li$_2$S—GeS$_2$ type materials; Li$_2$S—B$_2$S$_3$ type materials; Li$_3$PO$_4$—P$_2$S$_5$ type materials; and the like. Further, halogen added sulfide materials obtained by adding a halogen element to the sulfide material are also preferable. Specific examples thereof may include compounds including a lithium element, a phosphorus element, a sulfur element, and one or two or more halogen elements (e.g., at least one of Cl, Br, and I). Although not particularly restricted, the oxide solid electrolyte material may be an oxide having, for example, a NASICON structure, a garnet type structure, or a perovskite type structure. Specific examples thereof may include lithium lanthanum zirconium-containing composite oxide (LLZO), Al-doped-LLZO, lithium lanthanum titanium-containing composite oxide (LLTO), Al-doped-LLTO, and lithium phosphorus oxynitride (LIPON).

The solid electrolyte layer 16 may include, in addition to the solid electrolyte material, other components such as a binder resin, and various additives, if required. As the binder resins, for example, those exemplified as the material capable of being used for the positive electrode mixture material layer 12b may be appropriately used. The SP value (SPe) of the binder resin included in the solid electrolyte layer 16 may be, for example, 15 or less, 10 or less, or 9 or less, and may be 5 or more, 7 or more, or 8 or more. Incidentally, when the solid electrolyte layer 16 includes a plurality of kinds of resin materials, the mass weighted mean value of the SP values of respective resin materials may be referred to as SPe. In one embodiment, the solid electrolyte layer 16 desirably includes the same kind of binder resins as those of the positive/negative electrode mixture material layers 12b and 14b. For example, the positive electrode mixture material layer 12b, the negative electrode mixture material layer 14b, and the solid electrolyte layer 16 may include rubbers (e.g., butadiene type rubber) as the binder resin, respectively. The same kind of binder resins desirably account for 50 mass % or more of the total amount of the binder resins included in the solid electrolyte layer 16.

In one embodiment, the absolute value of the difference between the SP value of the binder resin of the solid electrolyte layer 16 and the SP value of the binder resin of the positive electrode mixture material layer 12b may only be 3 or less, 2 or less, 1 or less, or 0.5 or less. For example, the SP value of the binder resin of the solid electrolyte layer 16 and the SP value of the binder resin of the positive electrode mixture material layer 12b may be the same. In another embodiment, the absolute value of the difference between the SP value of the binder resin of the solid electrolyte layer 16 and the SP value of the binder resin of the negative electrode mixture material layer 14b may only be 3 or less, 2 or less, 1 or less, or 0.5 or less. For example, the SP value of the binder resin of the solid electrolyte layer 16 and the SP value of the binder resin of the negative electrode mixture material layer 14b may be the same. As one example, the sulfide solid electrolyte material undergoes a relatively larger change in volume in charging and discharging as compared with the other solid electrolyte materials described above. For this reason, when the solid electrolyte layer 16 includes a sulfide solid electrolyte material, peeling of the sealing part 20 tends to be caused. Therefore, the SP value of the binder resin of the solid electrolyte layer 16 and the SP value of the binder resin of the positive electrode mixture material layer 12b and/or the negative electrode mixture material layer 14b preferably satisfy the foregoing range. This can better improve the adhesion and the integrity between the laminated electrode body 10 and the sealing part 20.

Although not particularly restricted, the mixing ratio of the binder resin in the solid electrolyte layer 16 may be, for example, 0.1 to 20 parts by mass, 1 to 10 parts by mass, or 3 to 7 parts by mass for every 100 parts by mass of the solid electrolyte material.

In the present embodiment, the overall shape of the laminated electrode body 10 is a substantially rectangular parallelepiped shape. The laminated electrode body 10 has a lamination end face 10e of the exposed portion of the lamination structure of the rectangular positive electrode 12, the solid electrolyte layer 16, and the rectangular negative electrode 14 along the lamination direction Z. In a plan view, the lamination end face 10e is situated at the outer peripheral edge of the laminated electrode body 10. In other words, the lamination end faces 10e are situated at both end portions in the long side direction X, and both end portions in the short side direction Y of the laminated electrode body 10, respectively. The laminated electrode body 10 has four lamination end faces 10e. The lamination end face 10e includes the peripheral edge of the XY plane of the positive electrode mixture material layer 12b, and the peripheral edge of the XY plane of the negative electrode mixture material layer 14b. In the cross sectional view of FIG. 2, the width in the short side direction Y of the positive electrode mixture material layer 12b is smaller than the width in the short side direction Y of the negative electrode mixture material layer 14b. For this reason, the lamination end face 10e of the laminated electrode body 10 is in a shape in which unevenness is repeated along the lamination direction Z.

The sealing part 20 is disposed around the laminated electrode body 10, and along the lamination end face 10e of the laminated electrode body 10. The sealing part 20 is an insulator. The sealing part 20 has a resistance value of 100 MΩ or more when applied with 500 V using an insulation resistance meter. The sealing part 20 is attached to the lamination end face 10e of the laminated electrode body 10. The laminated electrode body 10 and the sealing part 20 have at least an integrity enough to prevent falling when vertically and horizontally inverted. The sealing part 20 seals the peripheral edges of the XY plane of the positive/negative electrode mixture material layers 12b and 14b. The sealing part 20 has a function of suppressing the collapse of the peripheral edges of the positive/negative electrode mixture material layers 12b and 14b, or slipping of the active materials from the positive/negative electrode mixture material layers 12b and 14b.

The sealing part 20 covers all the four lamination end faces 10e of the laminated electrode body 10. Namely, in a plan view, the sealing part 20 surrounds the outer peripheral edge of the laminated electrode body 10 in a rectangular shape. Further, in a cross sectional view, the sealing part 20 covers the overall length in the lamination direction Z of the lamination end face 10e. The length in the lamination direction Z of the sealing part 20 is equal to, or longer than the length in the lamination direction Z of the laminated electrode body 10. In a cross sectional view, the lamination end face 10e of the laminated electrode body 10 (e.g., the peripheral edges of the positive/negative electrode mixture material layers 12b and 14b) are not exposed. In one embodiment, the sealing part 20 may further cover the upper and lower surfaces in the lamination direction Z of the laminated electrode body 10. In other words, the sealing part 20 may fully cover all the six surfaces of the laminated electrode body 10 in a substantially rectangular parallelepiped shape.

In FIG. 2, the sealing part 20 has a shape in which unevenness is repeated along the lamination direction Z of the laminated electrode body 10. Namely, the uneven shape of the lamination end face 10e of the laminated electrode body 10 is buried with the sealing part 20, and is flattened. The sealing part 20 is arranged between a pair of negative electrodes 14 adjacent to each other in the lamination direction Z. For the laminated electrode body 10 attached with the sealing part 20, in the short side direction Y, the total of the width of the positive electrode mixture material layer 12b and the width of the sealing part 20 is equal to the total of the width of the negative electrode mixture material layer 14b and the width of the sealing part 20. As a result of this, the laminated electrode body 10 attached with the sealing part 20 is also excellent in durability against, for example, the load of an external force from the long side direction X or from the short side direction Y.

The sealing part 20 includes at least a sealing resin and insulation particles. The sealing resin essentially satisfies at least one of the following properties: (1) $\Delta SP_1 = |SPp-SPs|$ is 1.9 or less, where SPp represents the SP value of the binder resin included in the positive electrode mixture material layer 12b, SPs represents the SP value of the sealing resin, and $\Delta SP_1$ represents the absolute value of the difference between SPp and SPs; and (2) $\Delta SP_2 = |SPn-SPs|$ is 1.9 or less, where SPn represents the SP value of the binder resin included in the negative electrode mixture material layer 14b, SPs represents the SP value of the sealing resin, and $\Delta SP_2$ represents the absolute value of the difference between SPn and SPs. From the viewpoint of better improving the durability of the sealing part 20, desirably, both of the (1) and (2) are satisfied. The SP value (SPs) of the sealing resin may be, for example, 15 or less, 13 or less, or 11 or less, and may be 5 or more, 7 or more, or 8 or more. Incidentally, when the sealing part 20 includes a plurality of kinds of resin materials, the mass weighted mean value of the SP values of respective resin materials can be referred to as SPs.

From the viewpoint of enhancing the compatibility between the positive/negative electrode mixture material layers 12b and 14b and the sealing part 20, for the sealing resin, the $\Delta SP_1$ and $\Delta SP_2$ are preferably smaller, respectively, and are desirably, for example, 1 or less, 0.5 or less, or 0.1 or less. Particularly, $\Delta SP_1$ and/or $\Delta SP_2$ is desirably approximately 0 (0.05 or less). In one embodiment, the sealing resin may have the following property: (3) $\Delta SP_3 = |SPe-SPs|$ is 1.9 or less, where SPe represents the SP value of the binder resin included in the solid electrolyte layer 16, SPs represents the SP value of the sealing resin, and $\Delta SP_3$ represents the absolute value of the difference between SPp and SPs.

As the sealing resins, for example, the materials exemplified as the binder resins usable for the positive electrode mixture material layer 12b may be appropriately used. In one embodiment, the sealing resin desirably includes the same kind of resin material as the binder resin included in at least one of the positive/negative electrode mixture material layers 12b and 14b and the solid electrolyte layer 16. The same kind of resin material desirably accounts for 50 mass % or more of the total amount of the sealing resin. For example, the binder resins of the positive electrode mixture material layer 12b and/or the negative electrode mixture material layer 14b, and the sealing resin may include rubbers (e.g., butadiene type rubber). For example, the binder resins of the positive electrode mixture material layer 12b and/or the negative electrode mixture material layer 14b and the sealing resin may include vinyl halide resins (e.g., PVdF), respectively.

The insulation particle is typically a material not having compatibility with the sealing resin. For this reason, the size and the shape of the insulation particle are also kept at the sealing part 20. The insulation particle may be an inorganic particle, or may be an organic particle. Although not particularly restricted, examples of the inorganic particle may include metal material, ceramic material, glass frit, and glass fiber. Examples of the organic particle may include a thermoplastic resin material referred to as so-called engineering plastic such as glass fiber reinforced plastic (fiberglass reinforced thermoplastic; FRTP). The shape of the insulation particle may be a powder shape such as a granular shape, a fiber shape, or a flake shape.

The mean particle size (the particle size equivalent to the cumulative frequency of 50% from the smaller particle size side in the volume-based particle size distribution based on the laser diffraction/scattering method; this applies to the following) of the insulation particles is typically smaller than that of the positive electrode active material and/or negative electrode active material. The mean particle size of the insulation particles is typically smaller than that of the solid electrolyte material which can be included in the positive electrode mixture material layer 12b and/or the negative electrode mixture material layer 14b. This can better enhance the airtightness and the sealability of the sealing part 20. The mean particle size of the insulation particles may be, for example, 0.01 μm or more, 0.1 μm or more, or 0.5 μm or more, and 5 μm or less, 3 μm or less, 2 μm or less, or 1 μm or less. The mixing ratio of the insulation particles in the sealing part 20 may be, for example, 1 to 100 parts by mass, 5 to 70 parts by mass, or 10 to 50 parts by mass for every 100 parts by mass of the sealing resin.

Incidentally, the all-solid battery 1 including the laminated electrode body 10 attached with the sealing part 20 as disclosed in FIG. 1 can be manufactured by a manufacturing method including, for example, the following steps: (Step 1) of preparing the laminated electrode body 10; (Step 2) of preparing a molten composition including a sealing resin in a molten state, and insulation particles; (Step 3) of enclosing the laminated electrode body 10 into a mold having a space portion one size larger than the laminated electrode body 10 for decompression; and (Step 4) of, after vacuum injecting the molten composition into the mold, performing cooling, and forming the sealing part 20 on the lamination end face 10e of the laminated electrode body 10. With the manufacturing method, in Step 2, the sealing resin is once rendered into a molten state. This can better enhance the compatibility and the integrity with the binder resin included in the laminated electrode body 10. As a result, it is possible to form the sealing part 20 in stronger contact with the lamination end face 10e of the laminated electrode body 10.

As described up to this point, for the all-solid battery 1, the compatibility between the binder resin and the sealing resin has been improved, resulting in the enhancement of the adhesion and the integrity between the laminated electrode body 10 and the sealing part 20. Further, for the all-solid battery 1, the sealing part 20 includes insulation particles, resulting in an improvement of the mechanical strength of the sealing part 20. As a result, for the all-solid battery 1, it is difficult to peel the sealing part 20 from the lamination end face 10e of the laminated electrode body 10, so that the effects of the sealing part 20 can be implemented for a long term. For example, even when the all-solid battery 1 is applied with an external force such as vibration, or even when the laminated electrode body 10 repeatedly undergoes a change in volume during charging and discharging, the change in battery characteristics can be suppressed small.

Further, the collapse of the outer peripheral edge of the laminated electrode body 10, and slipping of the active material from the positive/negative electrode mixture material layers 12b and 14b can be suppressed, thereby keeping the high battery performances for a long period.

The all-solid battery 1 herein disclosed is usable for various uses. For example, the all-solid battery 1 can be preferably used as a power source (driving power source) for a motor to be mounted in a vehicle. Although the kind of the vehicles has no particular restriction, mention may be typically made of automobiles, such as Plug-in Hybrid automobile (PHV), hybrid automobile (HV), and electric automobile (EV).

Below, some examples regarding the present invention will be described. However, it is not intended that the present invention is limited to such specific examples.

Example 1

Manufacturing of Positive Electrode

First, as a positive electrode active material, particulate lithium transition metal composite oxide ($LiNi_{1/3}Mn_{1/3}Co_{1/3}O_2$, mean particle size 6 μm) was prepared. Using the sol-gel method, $LiNbO_3$ was coated onto the surfaces of the positive electrode active material particles. Specifically, first, into an ethanol solvent, $LiOC_2H_5$ and $Nb(OC_2H_5)_5$ were dissolved in an equimolar amount, thereby preparing a raw material composition. Then, using a tumbling fluidized coating machine (model "SFP-01" manufactured by POWREX CORP.), under atmospheric pressure, the raw material composition was deposited to the surfaces of the positive electrode active material particles. At this step, by adjusting the processing time, the deposited thickness of the raw material composition was adjusted to 5 nm. Then, the raw material composition-deposited positive electrode active material particles were subjected to a heat treatment under the conditions of under atmospheric pressure at 350° C./1 hour. As a result, a $LiNbO_3$-coated positive electrode active material was manufactured.

Then, the manufactured $LiNbO_3$-coated positive electrode active material, and glass ceramic (15LiBr-10LiI-75 ($0.75Li_2S/0.25P_2S_5$) as the solid electrolyte material, the mean particle size 2.5 μm) were mixed so as to achieve a mass ratio of positive electrode active material:solid electrolyte material=75:25, thereby preparing a mixed powder. Then, a SBR type binder (a copolymer of styrene:butadiene=60:40, the SP value: 8.6), and acetylene black as the conductive material were weighed so as to be each 6 parts by mass for every 100 parts by mass of positive electrode active material. Then, the mixed powder, the SBR type binder, and the conductive material were mixed with n-butyl butyrate as a solvent, and the mixture was kneaded by a stirrer, thereby preparing a slurry-shaped positive electrode forming composition (solid content 40%). The positive electrode forming composition was coated to the surface of aluminum foil (positive electrode collector, thickness 15 μm) by a blade coating method using an applicator, and was heated and dried at 120° C. for 20 minutes. This resulted in manufacturing of a positive electrode in which the positive electrode mixture material layer was fixed on the positive electrode collector.

Manufacturing of Negative Electrode

First, particulate Si (the mean particle size 6 μm) and graphite (C) as negative electrode active materials, and glass ceramic (the same one as that of the positive electrode) as a solid electrolyte material were mixed so as to achieve a mass ratio of Si:C:solid electrolyte material=53.4:1.6:45, thereby preparing a mixed powder. Then, a SBR type binder (a copolymer of styrene:butadiene=60:40, the SP value: 8.6), and acetylene black as a conductive material were each weighed so as to be 6 parts by mass for every 100 parts by mass of Si (negative electrode active material). Then, the mixed powder, the SBR type binder, and the conductive material were mixed with n-butyl butyrate as a solvent, and the mixture was kneaded by a stirrer, thereby preparing a slurry-shaped negative electrode forming composition (solid content 70%). The negative electrode forming composition was coated to the surface of copper foil (negative electrode collector, thickness 15 μm) by a blade coating method using an applicator, and was heated and dried at 120° C. for 20 minutes. This resulted in manufacturing of a negative electrode in which the negative electrode mixture material layer was fixed on the negative electrode collector.

Formation of Solid Electrolyte Layer

Then, glass ceramic (the same as that of the positive electrode and the negative electrode) as a solid electrolyte material and a SBR type binder (copolymer of styrene:butadiene=60:40, the SP value: 8.6) as a binder resin were weighed so as to achieve a mass ratio of solid electrolyte material:SBR type binder=95:5. Then, the solid electrolyte material and the SBR type binder were mixed with heptane as a solvent, and the mixture was kneaded for two minutes by an ultrasonic dispersing device (model "UH-50" manufactured by SMT Co., Ltd.), thereby preparing a slurry-shaped solid electrolyte forming composition (solid content 70%). The solid electrolyte forming composition was coated to the surface of the base material (aluminum foil) so as to achieve a coating weight of 60 mg/cm$^2$ by a blade coating method using an applicator, and was air dried, followed by heating and drying at 100° C. for 30 minutes. As a result, a sulfide solid electrolyte layer was formed on the base material.

Manufacturing of Laminated Electrode Body

First, the formed solid electrolyte layer was stamped into a square with an area of 100 cm$^2$ by a stamping machine, and was pressed under the conditions of 25° C. and a surface pressure of 1 ton/cm$^2$. Then, a positive electrode was laminated on one surface of the pressed solid electrolyte layer, and was pressed under the conditions of 25° C. and a surface pressure of 1 ton/cm$^2$. At this step, the positive electrode was arranged so that the side of the positive electrode mixture material layer is opposed to the solid electrolyte layer. Then, the base material fixed to the surface of the solid electrolyte layer was released. A negative electrode was laminated on the exposed surface of the solid electrolyte layer, and was pressed under a surface pressure of 6 tons/cm$^2$ at 25° C. At this step, the negative electrode was arranged so that the side of the negative electrode mixture material layer was opposed to the solid electrolyte layer. In this manner, a laminated electrode body was manufactured in which the positive electrode mixture material layer and the negative electrode mixture material layer were laminated so as to interpose the solid electrolyte layer therebetween.

Formation of Sealing Part

Then, the manufactured laminated electrode body was enclosed into a mold having a hollow portion, and the mold was pressurized. Then, the hollow portion in which the laminated electrode body is accommodated was decompressed. Then, by a transfer molding method, a sealing part was formed entirely around the laminated electrode body. Specifically, first, a SBR type resin (a copolymer of styrene:butadiene=60:40, the SP value: 8.6) as a sealing resin, and glass fiber (the mean particle size 1.0 μm) as an insulation particle were mixed so as to achieve a mass ratio of SBR type resin:glass fiber=100:30. Then, the mixture was heated in a blunger to 180° C., thereby preparing a molten composition. Then, the molten composition was injected from the runner portion of the mold, followed by cooling. Then, pressurization of the mold was removed, and the laminated electrode body was taken out from the mold. Then, the excess resin of the runner portion was cut off. This resulted in a laminated electrode body with the sealing part.

Construction of all-Solid Battery

First, as an exterior material, an aluminum laminate film was prepared. As the aluminum laminate film, a multilayer structured film was used in which a nylon layer serving as an outermost layer, an aluminum layer as a barrier layer, and a polypropylene layer as a sealant layer were laminated in this order. Then, the aluminum laminate film was formed into a bag shape. The resulting laminated electrode body with the sealing part was accommodated, and hermetically sealed, thereby constructing an all-solid battery (sulfide solid-state battery, Example 1).

Examples 2 to 5

In Example 2, an all-solid battery was constructed in the same manner as in Example 1, except that the insulation particles of the sealing part were changed to an alumina powder (the mean particle size 2 μm, crushed product). In Example 3, an all-solid battery was constructed in the same manner as in Example 1, except that the kind of the sealing resin of the sealing part, and the kind of the binder resin of the positive/negative electrode mixture material layer were both changed to PVdF (SP value: 7). In Example 4, an all-solid battery was constructed in the same manner as in Example 1, except that the kind of the sealing resin of the sealing part was changed to BR (butadiene rubber, the SP value: 8.2). In Example 5, an all-solid battery was constructed in the same manner as in Example 1, except that the kind of the sealing resin of the sealing part was changed to methyl acrylate (SP value: 10.1), and except that the kind of the binder resin of the positive/negative electrode mixture material layer was changed to a SBR type resin (a copolymer of styrene:butadiene=80:20, the SP value: 8.2). The specifications of Examples 1 to 5 are summarized in Table 1.

Comparative Examples 1 to 4

In Comparative Example 1, without forming a sealing part, with the peripheral edges of the positive/negative electrode mixture material layers opened, a laminated electrode body was accommodated in an aluminum laminate film, thereby constructing an all-solid battery. In Comparative Example 2, an all-solid battery was constructed in the same manner as in Example 1, except that the kind of the sealing resin of the sealing part was changed to polyamide (SP value: 13.6). In Comparative Example 3, an all-solid battery was constructed in the same manner as in Example 1, except that the kind of the sealing resin of the sealing part was changed to PMMA (polymethyl methacrylate, SP value: 9.6), and except that the kind of the binder resin of the positive/negative electrode mixture material layer was changed to PVdF (SP value: 7). In Comparative Example 4, an all-solid battery was constructed in the same manner as in Example 1, except that insulation particles were not added to the sealing part, and except that the kind of the sealing resin of the sealing part was changed to epoxy resin (SP value: 11.1), and except that in formation of a sealing part, the molten composition was injected into a mold, and then, the temperature of 180° C. was kept for 10 minutes. The specifications of Comparative Examples 1 to 4 are summarized in Table 2.

TABLE 1

| | | | Ex. 1 | Ex. 2 | Ex. 3 | Ex. 4 | Ex. 5 |
|---|---|---|---|---|---|---|---|
| Sealing part | Insulation particle (mixing ratio) | | Glass fiber | Alumina | Glass fiber | Glass fiber | Glass fiber |
| | Sealing resin | Kind | SBR (60/40) | SBR (60/40) | PVdF | BR | Methyl acrylate |
| | | SP value | 8.6 | 8.6 | 7 | 8.2 | 10.1 |
| Electrode | Binder resin | Kind | SBR (60/40) | SBR (60/40) | PVdF | SBR (60/40) | SBR (80/20) |
| | | SP value | 8.6 | 8.6 | 7 | 8.6 | 8.2 |
| | Difference in SP value | | 0 | 0 | 0 | 0.4 | 1.9 |
| Results | Vibration durability | | A | A | A | A | A |
| | Cycle durability | | Good | Good | Good | Good | Good |
| | Insulation retaining property | | Good | Good | Good | Good | Good |

TABLE 2

| | | | Ex. 1 | Ex. 2 | Ex. 3 | Ex. 4 |
|---|---|---|---|---|---|---|
| Sealing part | Insulation particle (mixing ratio) | | None | Glass fiber | Glass fiber | None |
| | Sealing resin | Kind | None | Polyamide | PMMA | Epoxy resin |
| | | SP value | — | 13.6 | 9.6 | 11.1 |
| Electrode | Binder resin | Kind | SBR (60/40) | SBR (60/40) | PVdF | SBR (60/40) |
| | | SP value | 8.6 | 8.6 | 7 | 8.6 |
| | Difference in SP value | | — | 4 | 2.6 | 2.5 |
| Results | Vibration durability | | C | B | B | C |
| | Cycle durability | | Poor | Good | Good | Poor |
| | Insulation retaining property | | Poor | Good | Good | Poor |

Evaluation of Cycle Durability of Sealing Part

For the constructed all-solid-state batteries (Examples 1 to 5, and Comparative Examples 1 to 4), the durability of each sealing part was evaluated. Specifically, first, under environment of 25° C., for each battery, a charging and discharging test (voltage range: 3.0 to 4.2 V, charging and discharging rate: 1 C, charging method: constant current (CC)/constant voltage (CV) charging and discharging) was carried out 100 cycles. Then, after the charging and discharging test, the exterior material (laminate) was opened, and (a) whether cracks of the sealing part were present or not, and, (b) whether the solid content (particles) slipped down from the laminated electrode body or not were confirmed. The results are shown in the relevant boxes of Tables 1 and 2. In Tables 1 and 2, "Good" represents that none of (a) and (b) were confirmed, and "Poor" represents that (a) and/or (b) was confirmed.

Evaluation of Insulation Retaining Property of all-Solid Battery

For the constructed all-solid-state batteries (Examples 1 to 5, and Comparative Examples 1 to 4), the durability of each laminated electrode body was evaluated. Specifically, first, in the same manner as described above, 100-cycle charging and discharging tests were carried out. Then, after the charging and discharging test, the insulation property between the laminated electrode body and the exterior material was confirmed. Specifically, using an insulation resistance meter, the resistance value between the tab part of the collector and the aluminum layer portion of the exterior material was measured. The results are shown in the relevant boxes of Tables 1 and 2. In Tables 1 and 2, "Good" represents that when 500 V is applied, the resistance value is 100 MΩ or more, namely, that the insulation property can be kept, and "Poor" represents that the resistance value is less than 100 MΩ, namely, that the insulation property cannot be kept, resulting in a short circuit.

Evaluation of Vibration Durability of Sealing Part

For the constructed all-solid-state batteries (Examples 1 to 5, and Comparative Examples 1 to 4), a vibration test according to ISO (International Organization for Standardization) 12405-1 (test of lithium-ion battery packs and systems for use in electrically propelled road vehicles) was conducted. The test is a composite random test of applying composite random waves up to 200 Hz to the battery. The test imitates the conditions of the battery mounted on a vehicle which undergoes vibration of mainly a low frequency of 100 Hz or less due to the vibration of, for example, a running or driving system. The test was started with each all-solid battery fully charged, and whether an abnormal condition (e.g., internal short circuit) has occurred or not during the test and after the test was confirmed. The results are shown in the relevant boxes of Tables 1 and 2. In Tables 1 and 2, A to C indicate the following:

"A": No abnormal condition during the test occurs, and the voltage drop after the test is less than 0.1 V;

"B": No abnormal condition during the test occurs, and the voltage drop after the test is 0.1 V or more and less than 0.5 V; and "C": A short circuit (a voltage drop to 0 V) occurs, or the voltage drop after the test is 0.5 V or more.

As shown in Table 2, in Comparative Example 1 not having the sealing part, the reduction of the insulation property of the all-solid battery after the cycle test, and the internal short circuit after the vibration test were observed. This can be considered due to the following: a short circuit was caused inside the battery by the charging and discharging cycle or vibration because the peripheral edges of the positive/negative electrode mixture material layers were left open. Further, Comparative Example 4 in which the sealing part did not include insulation particles showed the same results as those of Comparative Example 1 not having the sealing part. This can be considered due to the fact that the effects of the formation of the sealing part were not sufficiently exerted because of the insufficient strength of the sealing part. Still further, in Comparative Examples 2 and 3 in each of which the difference in SP value between the sealing resin of the sealing part and the binder resin of the electrode was large, the durability to the charging and discharging cycle was provided, but the durability to the load of vibration was a little low. This can be considered due to the following fact: the compatibility between the sealing resin of the sealing part and the binder resin of the electrode was insufficient, and hence the sealing part gradually fell from the positive/negative electrode mixture material layer.

In contrast to the Comparative Examples, as shown in Table 1, in Examples 1 to 5 in each of which the difference in SP value between the sealing resin of the sealing part and the binder resin of the electrode was suppressed to as relatively low as 1.9 or less, exhaustively, the durability of the sealing part to the charging and discharging cycle and the load of vibration was high. In other words, the change in battery characteristics was suppressed small to the change in volume of the laminated electrode body and the load of vibration. Such results indicate the significance of the technology herein disclosed. Further, comparison between Examples 1 and 2 indicates that the kind of the insulation particles of the sealing part has no particular restriction. Whereas, comparison among Examples 1, 3, 4, and 5 indicates that the kinds of the sealing resin of the sealing part and the binder resin of the electrode have no particular restriction.

Up to this point, the present invention was described in detail. However, the embodiments and Examples are merely illustrative, and the invention herein disclosed include various modifications and changes of the foregoing specific examples.

For example, in the embodiments, the solid electrolyte layer 16 included the solid electrolyte material. However, the present invention is not limited thereto. The solid electrolyte layer 16 may be, for example, a polymer gel electrolyte including a support salt (e.g., lithium salt) in a polymer matrix. Although not particularly restricted, examples of the polymer gel electrolyte may include: those obtained by impregnating a polymer electrolyte such as polyethylene oxide (PEO) with an electrolyte of a common lithium ion secondary battery; and those obtained by allowing an electrolyte of common lithium ion secondary battery to be held in the skeleton of a polymer compound not having lithium ion conductivity such as polyvinylidene fluoride (PVdF).

For example, in the embodiments, the laminated electrode body 10 included the positive electrode 12, the negative electrode 14, and the solid electrolyte layer 16, and the positive electrode 12 and the negative electrode 14 were laminated via the solid electrolyte layer 16. Namely, the laminated electrode body 10 did not have the bipolar electrode as disclosed in Japanese Patent Application Publication No. 2005-5163. However, the present invention is not limited thereto. The laminated electrode body may include, for example, a plurality of bipolar electrodes in each of which a positive electrode mixture material layer is fixed to one surface of a collector, and a negative electrode mixture material layer is fixed to the other surface thereof in place of the positive electrode 12 and the negative electrode 14. The laminated electrode body may include a plurality of the bipolar electrodes laminated via the solid electrolyte layers. The all-solid battery including such a laminated electrode body can also be preferably used as with the all-solid battery 1.

For example, in the embodiments, the battery case 1c was made of a laminate. However, the present invention is not limited thereto. The battery case 1c may be, for example, made of a resin, or made of a metal. The battery case 1c may include a flat rectangular parallelepiped-shaped case main body with the upper surface opened, and a lid body for closing the opening of the upper surface of the case main body.

For example, in the embodiments, the positive electrode-side tab part 12t and the negative electrode-side tab part 14t were disposed on the same side in the long side direction X, and the positive electrode terminal 13 and the negative electrode terminal 15 were led out from the same side in the long side direction X of the laminated electrode body 10. However, the present invention is not limited thereto. The positive electrode-side tab part 12t and the negative electrode-side tab part 14t may be respectively disposed, for example, on the opposite sides in the long side direction X across the laminated electrode body 10. In this case, the positive electrode terminal 13 and the negative electrode terminal 15 may be, for example, respectively led out from the opposite sides in the long side direction X across the laminated electrode body 10.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. An all-solid battery, comprising:
a laminated electrode body having a structure portion in which an electrode mixture material layer and a solid electrolyte layer are laminated; and
a sealing part for covering at least a lamination end face of the laminated electrode body,
wherein the electrode mixture material layer includes an active material and a binder resin,
the sealing part includes a sealing resin and insulation particles,
an absolute value of a difference between a solubility parameter of the binder resin included in the electrode mixture material layer and a solubility parameter of the sealing resin included in the sealing part is 1.9 (cal/cm$^3$)$^{0.5}$ or less, and
a mixing ratio of the insulation particles in the sealing part is 30 to 50 parts by mass for 100 parts by mass of the sealing resin.

2. The all-solid battery according to claim 1,
wherein the binder resin and the sealing resin include the same kind of resin.

3. The all-solid battery according to claim 2,
wherein the binder resin and the sealing resin include rubbers, respectively.

4. The all-solid battery according to claim 1,
wherein the electrode mixture material layer includes a Si type material as the active material.

5. The all-solid battery according to claim 1,
wherein the solubility parameter of the binder resin included in the electrode mixture material layer is 7 (cal/cm$^3$)$^{0.5}$ or more and 9 (cal/cm$^3$)$^{0.5}$ or less.

6. The all-solid battery according to claim 1,
wherein the solubility parameter of the sealing resin included in the sealing part is 7 (cal/cm$^3$)$^{0.5}$ or more and 11 (cal/cm$^3$)$^{0.5}$ or less.

7. The all-solid battery according to claim 1,
wherein the solid electrolyte layer includes a solid electrolyte material and a binder resin, and
an absolute value of a difference between a solubility parameter of the binder resin included in the solid electrolyte layer and the solubility parameter of the sealing resin included in the sealing part is 1.9 (cal/cm$^3$)$^{0.5}$ or less.

8. The all-solid battery according to claim 1,
wherein a mean particle size of the insulation particles is 0.5 μm or more and 5 μm or less.

9. The all-solid battery according to claim 1,
wherein the insulation particles comprise glass fiber.

10. An all-solid battery, comprising:
a laminated electrode body having a structure portion in which a positive electrode mixture material layer, a solid electrolyte layer, and a negative electrode mixture material layer are laminated in this order; and
a sealing part for covering at least a lamination end face of the laminated electrode body,
wherein the positive electrode mixture material layer includes a positive active material and a binder resin,
the negative electrode mixture material layer includes a negative active material and a binder resin,
the sealing part includes a sealing resin and insulation particles,
an absolute value of a difference between a solubility parameter of the binder resin included in the positive electrode mixture material layer and the solubility parameter of the sealing resin included in the sealing part is 1.9 (cal/cm$^3$)$^{0.5}$ or less,
an absolute value of a difference between a solubility parameter of the binder resin included in the negative electrode mixture material layer and the solubility parameter of the sealing resin included in the sealing part is 1.9 (cal/cm$^3$)$^{0.5}$ or less, and
a mixing ratio of the insulation particles in the sealing part is 30 to 50 parts by mass for 100 parts by mass of the sealing resin.

11. The all-solid battery according to claim 10,
wherein the solid electrolyte layer includes a solid electrolyte material and a binder resin, and
an absolute value of a difference between a solubility parameter of the binder resin included in the solid electrolyte layer and the solubility parameter of the sealing resin included in the sealing part is 1.9 (cal/cm$^3$)$^{0.5}$ or less.

12. The all-solid battery according to claim 10,
wherein the binder resin of the positive electrode mixture material layer and the binder resin of the negative electrode mixture material layer include the same kind of resin.

13. The all-solid battery according to claim 10,
wherein the binder resin of the positive electrode mixture material layer and the sealing resin include the same kind of resin.
14. The all-solid battery according to claim 13,
wherein the binder resin of the positive electrode mixture material layer and the sealing resin include rubbers, respectively.
15. The all-solid battery according to claim 10,
wherein the binder resin of the negative electrode mixture material layer and the sealing resin include the same kind of resin.
16. The all-solid battery according to claim 15,
wherein the binder resin of the negative electrode mixture material layer and the sealing resin include rubbers, respectively.
17. The all-solid battery according to claim 10,
wherein the negative electrode mixture material layer includes a Si type material as the active material.
18. The all-solid battery according to claim 10,
wherein a mean particle size of the insulation particles is 0.5 µm or more and 5 µm or less.
19. The all-solid battery according to claim 10,
wherein the insulation particles comprise glass fiber.

* * * * *